United States Patent Office 2,969,639
Patented Jan. 31, 1961

2,969,639

METHOD FOR DEVELOPING THRUST BY THE COMBUSTION OF BIPROPELLANTS

John E. Mahan, Bartlesville, Okla., assignor to Phillips Petroleum Company, a corporation of Delaware No Drawing. Filed Dec. 18, 1957, Ser. No. 703,703

19 Claims. (Cl. 60—35.4)

This invention relates to rocket fuels. In one aspect this invention relates to hypergolic fuels. In another aspect this invention relates to a method for propelling rockets.

This application is a continuation in part of my copending application Serial No. 366,381, filed July 6, 1953, now Patent No. 2,919,541 which itself is a continuation-in-part of my application Serial No. 257,973, filed November 23, 1951, now abandoned. This application is also a continuation-in-part of my copending application Serial No. 525,347, filed July 29, 1955 which itself is a continuation-in-part of my said copending application, Serial No. 366,381.

My invention is concerned with new and novel rocket propellants and their utilization. A rocket or jet propulsion device, such as is discussed herein is defined as a rigid container for matter and energy, so arranged that a portion of the matter can absorb the energy in kinetic form and subsequently eject it in a specified direction. The type rocket to which my invention is particularly applied is that type rocket propulsion device designated as a "pure" rocket, i.e., a thrust producer which does not make use of its surrounding atmosphere. A rocket of the type with which my invention is concerned is propelled in response to the steps of introducing a propellant material into a combustion chamber therein, and burning it under conditions that will cause it to release energy at a high but controllable rate immediately after its entry into the combustion chamber.

Rocket propellants in liquid form are advantageously utilized inasmuch as the liquid propellant materials can be carried in a light weight, low pressure vessel and thereafter be pumped into the combustion chamber. It is thus necessary that the combustion chamber, although being strong enough to stand high pressure and temperature, need be only large enough to insure combustion. The flow of liquid propellants into the combustion chamber can be regulated at will so that the thrust resulting from continuous or intermittent bursts of power can be sustained. Intermittent burning of the fuel contributes to a longer life of the combustion chamber and of the thrust nozzle.

Various methods and liquid combinations have been found to be useful as rocket propellants. Some propellants consist of a single material, and are termed "monopropellants." A monopropellant can be a homogeneous mixture of two or more materials. Those propellants involving two separate materials are termed "bipropellants" and normally consist of an oxidizer and a fuel. Hydrogen peroxide and nitromethane are each well known monopropellants. Well known bipropellants include hydrogen peroxide or liquid oxygen as the oxidant with a fuel component such as ethyl alcohol-water, ammonia, hydrazine or hydrogen. Additional known bipropellants include nitric acid as the oxidizer with aniline or furfuryl alcohol as the hypergolic fuel component.

When employing 90–100 percent nitric acid, i.e., "white fuming nitric acid" as the oxidizer in a rocket bipropellant fuel, it is often necessary, dependent upon the specific fuel component, to obtain more effective ignition than would normally be obtained, by dissolving from 6 to 23 percent by weight of nitrogen dioxide in white fuming nitric acid, thereby forming "red fuming" nitric acid. A fuel component of the bipropellant type described herein is spontaneously ignited upon contacting the oxidizer. For this reason such a bipropellant material is referred to herein as being "hypergolic." A ratio of oxidizer to hypergolic fuel, based upon stoichiometric amounts, can be utilized within the limits of 0.5:1 to 1.5:1 if desired. The efficiency of combustion is less at a ratio below 1:1 and the use of the oxidizer is less economical at ratios above 1:1. However, practical consideration may necessitate the use of higher ratios, even as high as 6:1.

Each of the following objects of the invention will be obtained by the various aspects of this invention.

An object of this invention is to provide new rocket propellants. Another object of the invention is to provide a novel hypergolic fuel. Another object of the invention is to provide a method for producing immediate thrust to a rocket-type device. Another object is to provide a select superior group of polyamines which are useful as hypergolic fuels. Other and further objects will be apparent to those skilled in the art upon study of the accompanying disclosure.

In accordance with the broad aspects of the invention in said copending application Serial No. 366,381, now Patent No. 2,919,546, I have found that organic polyamines, either in the presence or absence of normally liquid hydrocarbons form a fuel component which is highly "hypergolic" and suitable for use in the propulsion of rockets, guided missiles, and the like, in conjunction with an oxidizer. I have further found that these organic polyamines together with selected mercaptans, either in the presence or absence of normally liquid hydrocarbons, form a fuel component which is also highly "hypergolic" and suitable for the uses set forth above.

In accordance with the invention in said copending application Serial Number 366,381, now Patent No. 2,919,541, those organic polyamines are used which contain two or more substituent

groups attached to one or more carbon atoms wherein one or both R's is selected from the group consisting of a hydrogen atom and a hydrocarbon radical and wherein the total number of carbon atoms present in said polyamine is not greater than 30. Suitable hydrocarbon radicals (those radicals which contain only hydrogen and carbon atoms) are the alkyl, alkenyl, cycloalkyl, cycloalkenyl, aryl, alkaryl, and aralkyl radicals. The carbon atoms to which the substituent

group is attached may be a cyclic (carbocyclic) carbon atom, a carbon atom of a side chain group attached to a cyclic (carbocyclic) carbon atom, a carbon atom of a side chain group attached to a cyclic (carbocyclic) carbon atom, or a carbon atom of an acyclic molecule.

More specifically, the fuels of the invention now being claimed in said copending application, Serial No. 366,-

381, now Patent No. 2,919,541, are composed of (1) at least one polyamine together with a selected mercaptan or (2) at least one polyamine together with a selected mercaptan, plus a liquid hydrocarbon.

My copending application, Serial No. 525,347, discloses and claims certain there defined 1,2-diamino-1-alkenes as new compounds. As disclosed in said Serial No. 525,347 said 1,2-diamine-1-alkenes are useful as hypergolic fuels. Said 1,2-diamino-1-alkenes can be prepared by reacting under suitable conditions, an alpha-halo-aldehyde, having at least one hydrogen atom attached to the carbon atom alpha to the aldehyde group as disclosed and claimed in the copending application of R. C. Doss and H. W. Bost, Serial No. 525,346, filed July 29, 1955, now Patent No. 2,881,217.

I have now discovered that certain of the organic polyamines of said copending applications form a superior select group of hypergolic fuels which are far superior to the other polyamines (as hypergolic fuels) in that all of said superior polyamines have an ignition delay at 75° F. of less than 40 milliseconds. This superior select group of polyamines can be represented generically by the formula

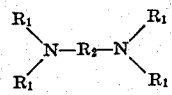

wherein each $R_1$ is selected from the group consisting of alkyl and alkenyl hydrocarbon radicals containing from 1 to 3 carbon atoms; and $R_2$ is selected from the group consisting of (a) alkylene, alkenylene, alkadienylene, and alkynylene hydrocarbon radicals containing from 2 to 6 carbon atoms, and (b)

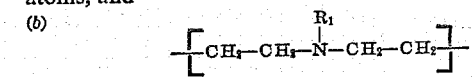

and

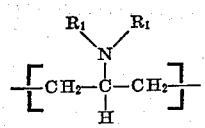

radicals wherein $R_1$ is as defined above.

Included among the above superior select group of hypergolic fuels represented by the above formula are the following polyamines: N,N,N',N'-tetraallylpropene-1,3-diamine; N,N,N',N'-tetramethylpropane-1,3-diamine; N,N,N',N'-tetramethylpropene-1,3-diamine; N,N,N',N'-tetramethylpropane-1,2-diamine; N,N,N',N'-tetramethylethane-1,2-diamine; N,N,N',N'-tetramethylbutane-1,2-diamine; N,N,N',N'-tetramethyl-1-butene-3,4-diamine; N,N,N',N'-2-pentamethylpropane-1,3-diamine; N,N,N',N'-tetramethylbutane-1,4-diamine; N,N,N',N'-tetramethyl-2-butene-1,4-diamine; N,N,N',N'-tetramethylhexane-1,6-diamine; N,N,N',N'-tetramethyl-1,2-diaminoethylene; N,N,N',N'-tetramethyl-2-butyne-1,4-diamine; N,N,N',N'-tetramethylbutane-1,3-diamine; N,N,N',N'-tetramethyl-1-butene-1,3-diamine; N,N,N',N'-tetramethyl-2-pentyne-1,4-diamine; N,N,N',N'-tetraethylethane-1,2-diamine; N,N,N',N'-tetraallylethane-1,2-diamine; N,N,N',N',N'',N''-hexamethylpropane-1,2,3-triamine; N,N,N',N',N''-pentamethyldiethylenetriamine; 1-diethylamino-4-dimethylamino-2-pentyne; N,N,N',N'-tetramethyl-1,3-butadiene-1,4-diamine; and mixtures of said polyamines.

In addition to the above recited specific compounds, the total reaction mixture or fractions thereof from the preparation of N,N,N',N'-tetraallyl-, or tetramethylpropene-1,3-diamine, is useful as a constituent of hypergolic fuel compositions according to the present invention. These compounds are known in the art and can be prepared by the manner described in U.S. Patent 2,565,529 by C. W. Smith, wherein a suitable alpha, beta-unsaturated aldehyde is reacted with one or more secondary mono-amines having attached to the nitrogen atom at least one alkenyl group with an olefinic bond in the 2,3-position relative to the nitrogen atom or by other similar methods.

All nitrogen containing compounds are not hypergolic. Indeed, all amines are not hypergolic. Table I given below, lists a number of amine compounds which I have found are not hypergolic. In obtaining the data set forth in Table I, the test procedure employed was to add 0.13 cc. of the material to be tested to 0.30 cc. of fuming nitric acid in the bottom of an 8-inch by 1-inch Pyrex test tube. These tests were made at 75° F.

TABLE I

|  | Oxidizer | |
| --- | --- | --- |
|  | White Fuming Nitric Acid | Red Fuming Nitric Acid |
| di-n-propylamine | NI [1] | NI |
| cyclohexylamine | NI | NI |
| myristyldimethylamine | NI | NI |
| methylaniline | NI | NI |
| dimethylaniline | NI | NI |
| diethylaniline | NI | NI |
| di-n-butylaniline | NI | NI |
| ethanolamine | NI | NI |
| ethylmonoethanolamine | NI | NI |
| acetylmethylamine | NI | NI |
| N-diacetylallylamine | NI | NI |
| N,N-di-n-butylbutenylamine | NI | NI |
| N-butyldibutenylamine | NI | NI |
| octyldimethylamine | NI | NI |

[1] NI means no spontaneous ignition took place upon contact of the said amine with the oxidizer.

It is to be particularly noted that the polyamines of the invention all have an ignition delay at 75° F. of less than 40 milliseconds. Ignition delay can be defined as the time interval between initial contact of the fuel and the oxidizer and the beginning of sustained combustion. Long ignition delays are undesirable in hypergolic propellant systems because they allow the accumulation of unreacted fuel and oxidizer in the rocket combustion chamber resulting in hard starts, rough burning, and sometimes destructive explosions. The data given in Table II below show that even though an amine may be hypergolic, it is not always a satisfactory hypergolic fuel. If the ignition delay is excessive the amine, or any other material, is not a good "all-purpose" hypergolic fuel. It is generally recognized by those skilled in the art that an ignition delay of about 50 milliseconds at about 75° F. is the maximum for a good "all purpose" hypergolic fuel. The data given in Table II were obtained by the drop test, the modified drop test and the impingement test procedures described hereinafter.

TABLE II

*Ignition delay data*

| Fuel | Oxidant | Temperature, °F. | Ignition Delay Milliseconds | Test Method |
| --- | --- | --- | --- | --- |
| Aniline | RFNA [1] | 75 | 193.9 | Modified drop test. |
| o-Toluidine | RFNA | 75 | [3] 132.4 | Do. |
| Methylamine | RFNA | 0 | [3] 373.6 | Do. |
| Ethylenediamine | WFNA [2] | 75 | 93 | Drop Test. |
| Propylenediamine | WFNA | 75 | 57 | Do. |
| N, N, N', N'-tetramethyl methylene diamine | WFNA | 75 | 95 | Do. |

[1] RFNA = red fuming nitric acid.
[2] WFNA = white fuming nitric acid.
[3] Fired only one time out of six tests.

In contrast, the data summarized in Table III below show the marked superiority of the select superior polyamines of my present invention. As indicated, three different test methods were employed to obtain the data in Table III. These test methods are described hereinafter.

TABLE III

*Ignition delay data*

[Results are given in milliseconds]

|  | Drop Test | | | Impingement Test | Drop Test | | | | Modified Drop Test | | |
| --- | --- | --- | --- | --- | --- | --- | --- | --- | --- | --- | --- |
|  | WFNA [1] 75° F. | RFNA [2] 75° F. | WFNA −40° F. | WFNA Room Temp. | WFNA | | RFNA | | RFNA | | |
|  |  |  |  |  | −75° F. | −40° F. | −75° F. | −40° F. | 75° F. | 0° F. | −65° F. |
| N,N,N',N'-tetraallylpropene-1,3-diamine | 6.3 | | | | | | | | | | |
| N,N,N',N'-tetramethylpropene-1,3-diamine | 15.5 | | | | | | | | 13.6 | 11.9 | 15.7 |
| N,N,N',N'-tetramethylpropene-1,3-diamine (crude) | 10.5 | | | | | | | | | | |
| N,N,N',N'-tetramethylpropane-1,3-diamine | .9 | | | 8.9 | 9.1 | 10 | 7.3 | 8.5 | 8.1 | 9.4 | 25.3 |
| N,N,N',N'-tetramethylpropane-1,2-diamine | .6 | | 13.3 | | 8.3 | 14 | 6.9 | 13 | 8.6 | 10.4 | 35.9 |
| N,N,N',N'-tetramethylethane-1,2-diamine | 12 | 9.3 | | 15 | 12 | 26 | 9.3 | 15 | 6.8 | 19.1 | 13.9 |
| N,N,N',N'-tetramethylbutane-1,2-diamine | 16 | 14 | | | 16 | 34 | 14 | | 18.0 | 28.8 | |
| N,N,N',N'-tetramethyl-1-butene-3,4-diamine | 4.6 | 4.1 | | | 4.6 | 13 | 4.1 | 6.7 | 5.2 | 3.3 | 5.2 |
| N,N,N',N'-2-pentamethyl propane-1,3-diamine | 24 | 22 | | | 38 | | 29 | 40 | | | |
| N,N,N',N'-tetramethylbutane-1,4-diamine | 7.4 | 7.4 | | 6.1 | 7.4 | 32 | 7.4 | 11 | 7.8 | 5.1 | 16.3 |
| N,N,N',N'-tetramethyl-2-butene-1,4-diamine | 4.3 | 4.3 | | 3.5 | 4.3 | 7.3 | 4.3 | 1.9 | 2.8 | 3.3 | 3.5 |
| N,N,N',N'-tetramethylhexane-1,6-diamine | 5.3 | 8.8 | | 8.4 | 5.3 | 22 | 8.8 | 12 | 8.2 | | |
| N,N,N',N'-tetramethyl-1,2-diaminoethylene | 3.6 | | 12.6 | | | | | | 4.0 | 8.2 | 10.9 |
| N,N,N',N'-tetramethyl-2-butyne-1,4-diamine | | | | | | | | | 4.7 | 3.5 | |
| N,N,N',N'-tetramethylbutane-1,3-diamine | | | | | | | | | 7.2 | 9.9 | 10.3 |
| N,N,N',N'-tetramethyl-1-butene-1,3-diamine | | | | | | | | | 6.3 | 10.2 | 23.3 |
| N,N,N',N'-tetramethyl-2-pentyne-1,4-diamine | | | | | | | | | 5.7 | | 17.6 |
| N,N,N',N'-tetraethylethane-1,2-diamine | | | | | | | | | 7.8 | 9.1 | 34.2 |
| N,N,N',N'-tetraallylethane-1,2-diamine | | | | | | | | | 5.0 | 14.4 | |
| N,N,N',N',N''-hexamethylpropane-1,2,3-triamine | | | | | | | | | 13.0 | 16.7 | 11.6 |
| N,N,N',N',N''-pentamethyldiethylenetriamine | | | | | | | | | 8.5 | 3.6 | 5.9 |
| 50 N,N,N',N'-tetramethylethane-1,2-diamine; 50 N,N,N',N'-tetraallylethane-1,2-diamine | | | | | | | | | 5.0 | 5.1 | 15.2 |
| 1-diethylamino-4-dimethylamino-2-pentyne | | | | | | | | | 9.4 | | |
| N,N,N',N' - tetramethyl - 1,3 - butadiene - 1,4 - diamine | | | | 5.7 | 2.9 | | 2.9 | 3.4 | | | |

[1] WFNA=white fuming nitric acid as oxidant.
[2] RFNA=red fuming nitric acid as oxidant.

A comparison of the data given in Table II above with the data given in Table III shows that the ignition delay of all the compounds listed in Table III is less than 40 milliseconds at 75° F. It should also be noted that the ignition delay at 75° F. of all the compounds listed in Table III is less than one-half the ignition delay at 75° F. of ethylene diamine, a known hypergolic fuel listed in Table II. A big majority of the compounds listed in Table III have an ignition delay at 75° F. of less than one-fourth the ignition delay of ethylene-diamine at 75° F. Thus the most preferred of the select superior polyamines are those having an ignition delay at 75° F. of less than 25 milliseconds. The difference between the ignition delay of the compounds listed in Table III and the ignition delay of aniline, another well known hypergolic fuel, is so great that there is hardly any comparison between said aniline and said compounds of Table III. Thus the data given in Table III above show that the class of polyamine represented by the compounds there listed is clearly and definitely superior to known hypergolic amine compounds.

Various methods have been developed for determining ignition delay of hypergolic fuels. Any suitable method for measuring the time interval between initial contact of the oxidant component and the fuel component and the beginning of sustained combustion can be employed. The ignition delay data reported herein were determined by three different methods: (1) employing a drop test apparatus described in detail in Example II herein, (2) employing an impingement test apparatus, and (3) employing a modified drop test apparatus. In all of the forms of ignition delay test equipment employed, the apparatus broadly comprised a reaction chamber, means for contacting fuel component and oxidant component, and a timer and system for detecting time intervals between initial contact of the fuel and oxidant components and the beginning of sustained combustion.

In the impingement test, the fuel component and the oxidant component are pressured into the reaction chamber through separate lines and nozzles by means of a source of constant nitrogen pressure, usually about 40 p.s.i.g. The nozzles are oriented so that the streams of fuel component and oxidant component impinge each other. The impingement of said streams interrupts a light beam directed toward a photocell. Said photocell, when desensitized by the interruption of said light beam, actuates a timer which marks the beginning of the ignition delay period. When ignition occurs, the light from the flame is detected by another photocell which stops said timer. The thus measured time interval is the ignition delay period. Any suitable nozzle, and arrangement of nozzles, can be employed in the test apparatus. In the runs reported herein the nozzles were orientated so that the streams of oxidant component and fuel component would impinge each other three-sixteenths of an inch from the nozzle tips.

The drop test apparatus is described in Example V. The modified drop test apparatus employed to determine some of the data given herein was identical with the drop test apparatus described in Example V herein except that the apparatus was modified by installing five photocells around the combustion chamber, instead of a single photocell, to detect the flame.

The fuel constituents of the present invention, i.e., the select superior group of organic polyamines, are hypergolic in an undiluted state and are also hypergolic when admixed with non-hypergolic materials, particularly hydrocarbons, in a state of dilution as high as 70 percent by volume of diluent when white fuming nitric acid is used as the oxidant. Suitable non-hypergolic materials which also may form a portion of the fuel composition include paraffin, cycloparaffin, and aromatic hydrocarbons in the $C_5$ to $C_{30}$ range or mixtures thereof, preferably the normally liquid materials. Examples of such hydrocarbon fuels are normal pentane, normal hexane, normal heptane, benzene, kerosene, isooctane, diisopropyl, diisobutylene, cyclohexene, cyclohexane, isodecane, methylcyclohexane, toluene, hexadecane, eicosane, hexacosane, pentatricontane, picene, cyclononacosane, liquid jet fuels such as JP-4 etc., and the like. Hydrocarbons in the $C_5$ to $C_{16}$ range are preferred.

The following Table IV summarizes results of dilution tests which were run to determine the maximum permissible dilution at which representation polyamines of the invention would retain their hypergolicity when diluted with various hydrocarbons. The tests reported in Table IV wherein normal heptane or toluene were used as diluents were run according to the procedure described in Examples II, III, and IV given below. The tests reported in Table IV wherein JP-4 jet fuel was used as the diluent were run using the modified drop test apparatus described above.

TABLE IV
Dilution tolerance of polyamine hypergolic fuels
[Figures Given are Maximum % of Hydrocarbon Present in a Mixture Which Would Still Fire]

| Compound | n-Heptane | | | | Toluene | | | | JP-4 Jet Fuel | |
| --- | --- | --- | --- | --- | --- | --- | --- | --- | --- | --- |
| | Room Temp. | | −40° C. | | Room Temp. | | −40° C. | | RFNA | |
| | RFNA[1] | WFNA[2] | RFNA | WFNA | RFNA | WFNA | RFNA | WFNA | +75° F. | 0° F. |
| N,N,N′,N′-tetraallylpropene-1,3-diamine | 70 | 70 | 30 | 30 | | | | | 30 | 20 |
| N,N,N′,N′-tetramethylpropene-1,3-diamine | 60 | 50 | | | 70 | 70 | 10 | 10 | | |
| N,N,N′,N′-tetramethylpropane-1,3-diamine | 50 | 40 | | | 50 | 50 | | | 40 | 20 |
| N,N,N′,N′-tetramethylpropane-1,2-diamine | 40 | 40 | | | | | | | 40 | 20 |
| N,N,N′,N′-tetramethylethane-1,2-diamine | | | | | | | | | 20 | 20 |
| N,N,N′,N′-tetramethylbutane-1,2-diamine | | | | | | | | | 20 | |
| N,N,N′,N′-tetramethyl-1-butene-3,4-diamine | | | | | | | | | 30 | 20 |
| N,N,N′,N′-tetramethylbutane-1,4-diamine | | | | | | | | | 30 | 20 |
| N,N,N′,N′-tetramethyl-2-butene-1,4-diamine | | | | | | | | | 40 | 20 |
| N,N,N′,N′-tetramethyl-1,2-diaminoethylene | | | | | | | | | 20 | 20 |
| N,N,N′,N′-tetramethyl-2-butyne-1,4-diamine | | | | | | | | | 30 | 20 |
| N,N,N′,N′-tetramethylbutane-1,3-diamine | | | | | | | | | 30 | 20 |
| N,N,N′,N′-tetramethyl-1-butene-1,3-diamine | | | | | | | | | 40 | 30 |
| N,N,N′,N′-tetraethylethane-1,2-diamine | | | | | | | | | 30 | 20 |
| N,N,N′,N′-tetraallylethane-1,2-diamine | | | | | | | | | 60 | 30 |
| N,N,N′,N′,N″,N″-hexamethylpropane-1,2,3-triamine | | | | | | | | | 20 | 20 |
| N,N,N′,N′,N″-pentamethyldiethylenetriamine | | | | | | | | | 20 | 20 |
| 50 N,N,N′,N′-tetramethylethane-1,2-diamine; 50 N,N,N′,N′-tetraallylethane-1,2-diamine | | | | | | | | | 30 | 20 |
| 80 N,N,N′,N′-tetramethylethane-1,2-diamine; 20 N,N,N′,N′-tetraallylethane-1,2-diamine | | | | | | | | | 40 | |

[1] RFNA = red fuming nitric acid.
[2] WFNA = white fuming nitric acid.

The jet fuel used in the test given in Table IV above had the following properties.

TABLE V
JP-4 jet fuel

Distillation, ° F.:
| | |
| --- | --- |
| IBP | 162 |
| 5% evap. | 162 |
| 10% evap. | 240 |
| 20% evap. | 266 |
| 30% evap. | 299 |
| 40% evap. | 312 |
| 50% evap. | 331 |
| 60% evap. | 358 |
| 70% evap. | 381 |
| 80% evap. | 408 |
| 90% evap. | 443 |
| 95% evap. | 468 |
| EP | 500 |
| Residue, volume percent | 1.0 |
| Loss, volume percent | 0.0 |
| Existent gum, mg./100 ml | 1.7 |
| Potential gum, mg./100 ml | 1.8 |
| Freeze point, ° F. | 70 |
| Reid vapor pressure, p.s.i. | 1.8 |
| Density, gm./cc. @ 20° F. | 0.772 |
| Sulfur, total, weight percent | 0.109 |
| Aniline point, ° F. | 128.5 |
| Aromatics, volume percent | 13.2 |
| Bromine number | 1.1 |
| Smoke point, mm. | 24.5 |
| Smoke volatility index | 56.8 |

The following examples will serve to further illustrate the invention.

EXAMPLE I

A reaction flask fitted with thermometer, dropping funnel, reflux condenser and stirring unit was charged with a mixture of 50 grams of finely powdered anhydrous potassium carbonate, 150 grams of diethyl ether and 194 grams of diallylamine. As the mixture was stirred vigorously, 56 grams of acrolein were slowly added with cooling to maintain the reaction mixture between 10 and 15° C. (50 to 59° F.). After all the acrolein had been added, the reaction mixture was kept at 5 to 10° C. (41 to 50° F.) and stirred for 17 hours. The contents of the reactor were then filtered to remove the solid desiccant; a dark-red filtrate was recovered. The ether and low boiling components, including unreacted acrolein and diallylamine, were removed by fractional distillation. The higher boiling material was then transferred to a vacuum distillation apparatus and distilled under reduced pressure. A summary of the distillation results is presented in the following table:

| Fraction | Head Temperature, ° C. | Kettle Pressure, mm. | Refractive Index at 20° C. | Wt. Grams | Wt. Percent |
| --- | --- | --- | --- | --- | --- |
| No. 1 Light Materials | 93 | 1 | | 97.8 | 29.2 |
| No. 2 N,N,N′N′-tetra-allylpropene-1,3-diamine | 93–105 | 1.5 | 1.4953 | 57.2 | 17.1 |
| No. 3 Unidentified heavier materials | 135–200 | 3 | 1.5182 | 27.9 | 8.3 |
| Residue | 200 | | | 152.0 | 45.4 |
| Total | | | | 334.9 | 100 |

EXAMPLE II

N,N,N',N'-tetraallylpropene-1,3-diamine and the other materials recovered from the fractionation of Example I were tested for spontaneous ignition employing fuming nitric acid as the oxidant. The temperature of the fuel and oxidant was maintained at room temperature (21° C.). In each test 0.13 ml. of the fuel or a diluted solution thereof was dropped into a 1″ x 8″ test tube containing 0.3 ml. of fuming nitric acid. The inert diluent (n-heptane) was employed to determine the amount of dilution which each fuel would tolerate and retain its hypergolic properties. The results are set forth in the following table.

| Fuel | Oxidant | Maximum Percent Dilution with n-heptane with Retention of Hypergolicity |
|---|---|---|
| Fraction No. 1 | RFNA | 50 |
|  | WFNA | 40 |
| Fraction No. 2 (N,N,N',N'-tetraallylpropene-1,3-diamine) | RFNA | 70 |
|  | WFNA | 70 |
| Fraction No. 3 | RFNA | 70 |
|  | WFNA | 60 |

In addition to the room temperature tests previously described, N,N,N',N'-tetraallyl-1,3-diaminopropene and other materials recovered from the fractionation procedure of Example I were also tested for spontaneous ignition at −40° C. Prior to testing, the temperature of the fuel and oxidant was lowered to −40° C. Tests were conducted employing 0.13 ml. of fuel or a diluted solution thereof and 0.3 ml. of fuming nitric acid. Results are recorded below.

| Fuel | Oxidant | Maximum percent Dilution with n-heptane with Retention of Hypergolicity at −40° C. |
|---|---|---|
| Fraction No. 2 (N,N,N',N'-tetraallylpropene-1,3-diamine) | RFNA | 30 |
|  | WFNA | 20 |
| Fraction No. 3 | RFNA | 40 |
|  | WFNA | 10 |

In addition to the above tests, the crude reaction mixture obtained from the procedure of Example I was also tested for self-ignition properties. Prior to testing, ether and other low boiling materials were removed by heating the reaction mixture in a warm water bath under reduced pressure provided by a water aspirator. Results are recorded below.

| Fuel | Oxidant | Maximum Percent Dilution with n-heptane with Retention of Hypergolicity |
|---|---|---|
| Crude Reaction Mixture from the Run Described in Example I (Ether and low boiling materials removed) | RFNA | Not diluted. |
|  | WFNA | Do. |
| Do | RFNA | 60. |
|  | WFNA | 60. |

EXAMPLE III

A run for the preparation of N,N,N',N'-tetraallylpropene-1,3-diamine was conducted in the manner described in Example I except that the reaction mixture was stirred for 12.5 hours. The reaction mixture was very dark in color and viscous. This material was distilled to remove unreacted diallylamine and other volatile materials leaving a black, plastic residue in the kettle. This material was tested for spontaneous ignition employing fuming nitric acid as oxidant. Tests were conducted with the fuel and oxidant maintained at room temperature (21° C.). In the first test, a small particle of the solid, plastic residue was dropped into 0.3 ml. of fuming nitric acid in a 1″ x 8″ test tube. In addition this residue was dissolved in n-heptane and the maximum dilution that the material would tolerate and maintain its self-ignition properties was determined. 0.13 ml. of fuel solution was employed with 0.3 ml. of fuming nitric acid as described in the test procedure of Example II. Results are set forth below.

| Fuel | Oxidant | Maximum Percent Dilution with n-heptane with Retention of Hypergolicity |
|---|---|---|
| Plastic residue | RFNA | Not diluted. |
|  | WFNA | Do. |
| Plastic residue dissolved in n-heptane | RFNA | 50. |
|  | WFNA | 50. |

EXAMPLE IV

A run for the preparation of N,N,N',N'-tetraallylpropene-1,3-diamine was conducted in the manner described in Example I except that the reaction mixture was stirred for 16 hours. After filtering off the potassium carbonate, the reaction mixture was stripped of ether. Then half of the de-etherified material was refractionated to remove everything up to diallylamine under reduced pressure (head temperature 35° C., corr.). The remaining half of this material was refractionated to remove everything up to and including diallylamine under reduced pressure (head temperature, 117° C., corr.). These two materials were tested for self-ignition properties at 21° C. and at −40° C. in the manner set forth in previous samples. Results are recorded below:

| Fuel | Test Temperature ° C. | Oxidant | Maximum Dilution with n-heptane with Retention of Hypergolicity |
|---|---|---|---|
| Crude product (ether removed) | 21 | RFNA | 70 |
|  |  | WFNA | 60 |
| Do | −40 | RFNA | 21 |
|  |  | WFNA | 10 |
| Crude product (ether and diallylamine removed) | 21 | RFNA | 70 |
|  |  | WFNA | 60 |
| Do | −40 | RFNA | 40 |
|  |  | WFNA | 10 |

EXAMPLE V

A drop test apparatus comprising an injection nozzle inserted to within 1″ of the bottom of a 1″ x 8″ test tube was employed to determine the ignition delay in milliseconds of N,N,N',N'-tetraallylpropene-1,3-diamine. A small quantity of fuel (0.2 ml.) was placed in the bottom of the test tube and 0.3 ml. of white fuming nitric acid was injected into the fuel. A constant pressure nitrogen surge chamber provided a source of approximately 40 p.s.i.g. pressure to inject the oxidizer into the fuel. The oxidant temperature was maintained constant by circulating a coolant through a jacket surrounding the injection nozzle and the fuel temperature was maintained constant by means of a constant temperature bath surrounding the test tube. A solenoid coil actuated the injector to provide an accurately metered amount of oxidant. The ignition delay interval was determined as the time between contact of the oxidant with the fuel and the presence of flame as sensed by a photocell. The start of the ignition delay period was obtained by sensing the electric impulse to the solenoid coil and correcting the data for a practically constant lag of 6.3 ±1.5 milliseconds for the oxidant to reach the fuel.

N,N,N',N'-tetraallylpropene-1,3-diamine was tested employing the apparatus described and was found to have an average ignition delay of 6.3 milliseconds.

This is an extremely short delay compared to known hypergolic fuels, for example, furfuryl alcohol, a known hypergolic fuel, had an ignition delay of 27 milliseconds as determined by the same apparatus and test procedure.

EXAMPLE VI

N,N,N',N' - tetramethylpropene - 1,3 - diamine was prepared from dimethylamine and acrolein by substantially the same procedure as previously employed for N,N,N',N' - tetraallylpropene - 1,3 - diamine. The crude material, in 73.8 percent yield, was distilled in an 18-inch column. A 30 percent theoretical yield of distilled product was obtained, along with 22 percent solid kettle residue.

These materials were examined for dilution data and ignition delay with the drop tester of Example V using standard techniques.

| Material | B.P., °C. | $n_D^{20}$ | Toluene Dilution | | | | Ignition Delay, milliseconds |
|---|---|---|---|---|---|---|---|
| | | | Room temp. | | RFNA | −40° C. WFNA | |
| | | | RFNA | WFNA | | | |
| N,N,N',N'-Tetramethylpropene-1,3-diamine. | ¹ 48 | 1.4589 | 79 | 70 | 10 | 10 | 15.5 @ 24° C. |
| Crude N,N,N',N'-Tetramethyl-propene-1,3-diamine. | | 1.4668 | 70 | 70 | 20 | 20 | 10.5 @ 24° C. |
| Plastic kettle product | | | Hypergolic | | | | |

¹ At 10.3 mm. Hg.

While the invention has been described employing white fuming and red fuming nitric acids, other oxidants are suitable oxidants for these hypergolic fuels in addition to white or red fuming nitric acid and can be used in the bipropellant fuel compositions of our invention. Suitable oxidants include materials such as hydrogen peroxide, ozone, nitrogen tetroxide, liquid oxygen and mixed acids, especially anhydrous mixtures of nitric and sulfuric acids such as 80 to 90 percent by volume of white or red fuming nitric acid and 10 to 20 percent by volume anhydrous or fuming sulfuric acid. It is within the scope of this invention to employ, preferably dissolved in the oxidizer, ignition catalysts or oxidation catalysts. These oxidation catalysts include certain metal salts, such as the chlorides and naphthenates of iron, zinc, cobalt and similar heavy metals.

As will be evident to those skilled in the art, various modifications, substitutions and changes may be made or followed in the light of the foregoing disclosure without departing from the spirit or scope of the invention.

I claim:

1. In the method for developing thrust by the combustion of bipropellant components in a combustion chamber of a reaction motor, the steps comprising separately and simultaneously injecting a stream of an oxidant component and a stream of a fuel component into a combustion chamber of said motor in such proportions as to produce spontaneous ignition, said fuel component comprising at least one polyamine having the formula $$\begin{array}{c} R_1 \quad\quad R_1 \\ \diagdown \quad\quad \diagup \\ N-R_2-N \\ \diagup \quad\quad \diagdown \\ R_1 \quad\quad R_1 \end{array}$$

wherein each $R_1$ is selected from the group consisting of alkyl and alkenyl hydrocarbon radicals containing from 1 to 3 carbon atoms; and $R_2$ is selected from the group consisting of (a) alkylene, alkenylene, alkadienylene and alkynylene hydrocarbon radicals containing from 2 to 6 carbon atoms and (b)
$$-\left[CH_2-CH_2-\underset{\underset{R_1}{|}}{N}-CH_2-CH_2\right]-$$

and $$-\left[CH_2-\underset{\underset{H}{|}}{\overset{\overset{R_1}{|}}{\underset{|}{N}}\atop C}-CH_2\right]-$$

radicals wherein $R_1$ is as defined above.

2. A method according to claim 1 wherein said fuel component is N,N,N',N'-tetramethylpropane-1,3-diamine.
3. A method according to claim 1 wherein said fuel component is N,N,N',N'-tetramethylpropane-1,2-diamine.
4. A method according to claim 1 wherein said fuel component is N,N,N',N'-tetramethylethane-1,2-diamine.
5. A method according to claim 1 wherein said fuel component is N,N,N',N'-tetramethylbutane-1,3-diamine.
6. A method according to claim 1 wherein said fuel component is N,N,N',N' - tetramethyl - 2 - butene - 1,4-diamine.

7. A fuel composition capable of spontaneous ignition when contacted with an oxidant, said fuel consisting essentially of at least 30 percent by volume of at least one polyamine having the formula $$\begin{array}{c} R_1 \quad\quad R_1 \\ \diagdown \quad\quad \diagup \\ N-R_2-N \\ \diagup \quad\quad \diagdown \\ R_1 \quad\quad R_1 \end{array}$$

wherein each $R_1$ is selected from the group consisting of alkyl and alkenyl hydrocarbon radicals containing from 1 to 3 carbon atoms; and $R_2$ is selected from the group consisting of (a) alkylene, alkenylene, alkadienylene, and alkynylene hydrocarbon radicals containing from 2 to 6 carbon atoms and (b)
$$-\left[CH_2-CH_2-\underset{\underset{R_1}{|}}{N}-CH_2-CH_2\right]-$$

and $$-\left[CH_2-\underset{\underset{H}{|}}{\overset{\overset{R_1}{|}}{\underset{|}{N}}\atop C}-CH_2\right]-$$

radicals wherein $R_1$ is as defined above, and a normally liquid hydrocarbon in an amount up to 70 percent by volume.

8. A fuel composition according to claim 7 wherein said polyamine is N,N,N',N'-tetramethylpropane-1,3-diamine.
9. A fuel composition according to claim 7 wherein said polyamine is N,N,N',N'-tetramethylpropane-1,2-diamine.
10. A fuel composition according to claim 7 wherein said polyamine is N,N,N',N' - tetramethylethane - 1,2-diamine.
11. A fuel composition according to claim 7 wherein said polyamine is N,N,N',N'-tetramethylbutane-1,3-diamine.
12. A fuel composition according to claim 7 wherein said polyamine is N,N,N',N'-tetramethyl-2-butene-1,4-diamine.
13. In the method for developing thrust by the combustion of bi-propellant components in a combustion chamber of a reaction motor, the steps comprising separately and simultaneously injecting a stream of an oxidant component and a stream of a fuel component into a combustion chamber of said motor in such proportions as to produce spontaneous ignition, said fuel component consisting essentially of at least 30 percent by volume of at least one polyamine having the formula

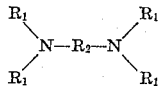

wherein each $R_1$ is selected from the group consisting of alkyl and alkenyl hydrocarbon radicals containing from 1 to 3 carbon atoms; and $R_2$ is selected from the group consisting of (a) alkylene, alkenylene, alkadienylene, and alkynylene hydrocarbon radicals containing from 2 to 6 carbon atoms and (b)

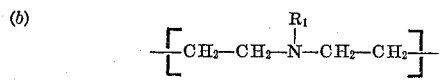

and

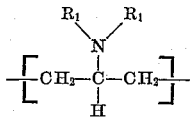

radicals wherein $R_1$ is as defined above, and a normally liquid hydrocarbon in an amount up to 70 percent by volume.

14. A method according to claim 13 wherein said polyamine is N,N,N',N'-tetramethylpropane-1,3-diamine.

15. A method according to claim 13 wherein said polyamine is N,N,N',N'-tetramethylpropone-1,2-diamine.

16. A method according to claim 13 wherein said polyamine is N,N,N',N'-tetramethylhexane-1,2-diamine.

17. A method according to claim 13 wherein said polyamine is N,N,N',N'-tetramethylbutane-1,3-diamine.

18. A method according to claim 13 wherein said polyamine is N,N,N',N'-tetramethyl-2-butene-1,4-diamine.

19. In the method for developing thrust by the combustion of bi-propellant components in a combustion chamber of a reaction motor, the steps comprising separately and simultaneously injecting a stream of an oxidant component and a stream of a fuel component into a combustion chamber of said motor, in such proportions as to produce spontaneous ignition, said fuel component comprising at least one polyamine selected from the group of polyamine consisting of N,N,N',N'-tetraallyl propene-1,3-diamine; N,N,N',N'-tetramethylpropene-1,3-diamine; N,N,N',N'-tetramethylpropane-1,3-diamine; N,N,N',N'-tetramethylpropane-1,2-diamine; N,N,N',N'-tetramethylethane-1,2-diamine; N,N,N',N'-tetramethylbutane-1,2-diamine; N,N,N',N' - tetramethyl - 1 - butene - 3,4 - diamine; N,N,N',N' - 2 - pentamethylpropane - 1,3 - diamine; N,N,N',N' - tetramethylbutane - 1,4 - diamine; N,N,N',N'-tetramethyl-2-butene-1,4-diamine; N,N,N',N'-tetramethyl-hexane-1,6-diamine; N,N,N',N'-tetramethyl-1,2-diaminoethylene; N,N,N',N'-tetramethyl-2-butyne - 1,4 - diamine; N,N,N',N'-tetramethylbutane - 1,3 - diamine; N,N,N',N'-tetramethyl-1-butene-1,3-diamine; N,N,N',N'-tetramethyl-2-pentyne-1,4-diamine; N,N,N',N' - tetraethylethane - 1,2-diamine; N,N,N',N' - tetraallylethane - 1,2 - diamine; N,N,N',N',N'',N'' - hexamethylpropane - 1,2,3 - triamine, N,N,N',N',N''-pentamethyldiethylenetriamine; 1-diethylamino-4-dimethylamino-2-pentyne; and N,N,N',N'-tetramethyl-1,3-butadiene-1,4-diamine.

References Cited in the file of this patent
UNITED STATES PATENTS

| | | |
|---|---|---|
| 2,512,297 | Biswell et al. | June 20, 1950 |
| 2,565,529 | Smith | Aug. 28, 1951 |